US008444341B2

(12) United States Patent
Briosi

(10) Patent No.: US 8,444,341 B2
(45) Date of Patent: May 21, 2013

(54) DEVICE FOR THE FORCED LOCKING OF TWO ELEMENTS ORIENTED ORTHOGONALLY TO ONE ANOTHER

(75) Inventor: Antonello Briosi, Rovereto (IT)

(73) Assignee: Metalisistem S.p.A., Rovereto (TN) (IT)

( * ) Notice: Subject to any disclaimer, the term of this patent is extended or adjusted under 35 U.S.C. 154(b) by 28 days.

(21) Appl. No.: 12/803,824

(22) Filed: Jul. 7, 2010

(65) Prior Publication Data
US 2011/0020058 A1     Jan. 27, 2011

(30) Foreign Application Priority Data
Jul. 8, 2009    (IT) .............................. MI2009A1212

(51) Int. Cl.
*F16B 1/00* (2006.01)
(52) U.S. Cl.
USPC ........... 403/205; 403/282; 403/297; 403/371; 403/222; 403/280
(58) Field of Classification Search
USPC ................. 403/258, 260, 262, 277–283, 297, 403/314, 374.3, 374.4, 371, 222, 223, 227, 403/205; 248/235, 247, 395.11; 211/182, 211/183; 411/338, 546
See application file for complete search history.

(56) References Cited

U.S. PATENT DOCUMENTS

| 2,319,109 | A | * | 5/1943 | Bulloch | 482/148 |
|---|---|---|---|---|---|
| 4,094,054 | A | * | 6/1978 | Fischer | 29/460 |
| 5,288,162 | A | * | 2/1994 | Bisping et al. | 403/408.1 |
| 5,741,083 | A | * | 4/1998 | Schvartz | 403/297 |
| 6,118,073 | A | * | 9/2000 | Lau et al. | 174/66 |
| 6,238,127 | B1 | * | 5/2001 | Jhumra et al. | 403/282 |
| 6,361,239 | B1 | * | 3/2002 | Parikh et al. | 403/282 |
| 7,337,729 | B2 | * | 3/2008 | Briosi | 108/107 |
| 7,413,367 | B2 | * | 8/2008 | Hawang | 403/297 |
| 7,509,702 | B2 | * | 3/2009 | Cantis et al. | 14/78 |
| 7,699,571 | B2 | * | 4/2010 | Booher et al. | 411/546 |
| 7,785,054 | B2 | * | 8/2010 | Parisi et al. | 411/338 |
| 2004/0094496 | A1 | * | 5/2004 | MacDonald | 211/189 |

* cited by examiner

*Primary Examiner* — Victor MacArthur
*Assistant Examiner* — Jonathan Masinick
(74) *Attorney, Agent, or Firm* — Bucknam and Archer

(57) ABSTRACT

A device for the forced locking of two elements oriented orthogonally to one another, especially suitable for steadily connecting and constraining two tubular elements (10), (12) with quadrangular or polygonal section which are partly delimited by a U-shaped band (22) and which have, on at least one face, a plurality of pairs of shaped recesses (14), whereas the band (22) is correspondingly provided with pairs of complementary projections (16) developed projecting on the inner front of the opposite vertical and parallel branches (18) and (20) thereof. The device further includes a bush (32), extending between the branches (18) and (20) of band (22) and fitted, at one end, on a collar (28) which develops projecting along the inner front of branches (18) and (20), whereas the opposite end of bush (32) constitutes the inlet for a screw (30) the end whereof engages in a threaded hole (28') delimited by the collar (28), bush (32) being extended transversally in the tubular element (10) or (12), provided with aligned holes (38), (40) along two opposite faces, starting from a hole (26) of the band (22).

5 Claims, 4 Drawing Sheets

DEVICE FOR THE FORCED LOCKING OF TWO ELEMENTS ORIENTED ORTHOGONALLY TO ONE ANOTHER

BACKGROUND OF THE INVENTION

The present invention relates to a device for the forced locking of two elements oriented orthogonally to one another.

More in particular, the present invention relates to a device as defined above, wherein the elements oriented orthogonally to one another consist of metal tubular bodies with a quadrangular or polygonal section, which on at least two faces are delimited by a "U" shaped band, equally made of metal. Said tubular bodies comprise, on at least two opposite faces, a plurality of pairs of shaped recesses, suitably spaced from one another, wherein corresponding projections made on the "U" bands abut. A solution of this type, intended for creating modular shelving wherein said tubular bodies are oriented orthogonally to one another, is also known from EP 1,516,559 by the same applicant, and comprises a shaped pin that is inserted crosswise into one of the tubular bodies for fixing the band. Said pin comprises opposite conical zones that make the band tighten both in longitudinal and in cross direction, eliminating a shift originally provided between the holes of one of the tubular bodies and those of the band wherein the pin itself is inserted. A precise and steady coupling is thus obtained over time.

However, it has been found that this type of locking does not exclude the possibility of forming even little clearances over time and due to strains, between the tubular bodies; especially in crosswise direction, at the conical zone close to the coupling pin head, the thrust of a tubular body on the other is less than what occurs at the opposite conical zone, wherein said pin rests on a larger surface. In a bearing structure, a tightening of this kind between two elements that must ensure the load stability may lead to imbalance and give rise to annoying creaks.

In the solution described in EP 1,516,559, moreover, the bottom end of the locking pins screws into a seat formed by a collar projecting outwards, made on each of the bands. As a consequence, the structure formed by the union of multiple tubular bodies orthogonal to one another implies the presence of as many projecting collars as the bands; such collars may constitute hazards points for the people in charge of the structure.

SUMMARY OF THE INVENTION

The object of this invention is to obviate the drawbacks mentioned hereinabove.

More in particular, the object of the present invention is to provide a device for the forced locking of two elements oriented orthogonally to one another, wherein said elements are tubular bodies with a quadrangular or polygonal section and are at least partly delimited by a "U" shaped band, suitable for obtaining a precise and steady, besides evenly distributed, coupling of the tubular bodies over time.

A further object of the invention is to provide a forced locking device which should allow constraining said bodies to one another without the need of treating projecting collars or protuberances of any kind on the bodies themselves and/or on the "U" bands that partly delimit them.

A further object of the invention is to provide the users with a device for the forced locking of two elements oriented orthogonally to one another suitable for ensuring a high level of resistance and reliability over time, also such as to be easily and inexpensively constructed.

These and other objects are achieved by the device for the forced locking of two elements oriented orthogonally to one another of the present invention, especially suitable for steadily connecting and constraining two tubular elements with quadrangular or polygonal section which are partly delimited by a U-shaped band and comprise, on at least one face, a plurality of pairs of shaped recesses, whereas the band is correspondingly provided with pairs of complementary projections developed projecting on the inner front of the opposite vertical and parallel branches thereof; said device is essentially characterised in that it comprises a bush, extending between said branches and said band and fitted, at one end, on a collar which develops projecting along the inner front of said branches, whereas the opposite end of said bush constitutes the inlet for a screw the end whereof engages in a threaded hole delimited by the collar, the same bush being extended transversally in one of the tubular elements, provided with aligned holes along two opposite faces, starting from a hole of the band.

BRIEF DESCRIPTION OF THE DRAWING

The construction and functional features of the forced locking device of the present invention shall be better understood from the following detailed description, wherein reference is made to the annexed drawing tables showing a preferred and non-limiting embodiment thereof, and wherein.

DETAILED DESCRIPTION OF THE INVENTION

With reference to said figures, the forced locking device of the present invention is applied to two metal tubular elements oriented orthogonally to one another and partly delimited by a "U" shaped band, as described in EP 1,516,559.

Figure 2:
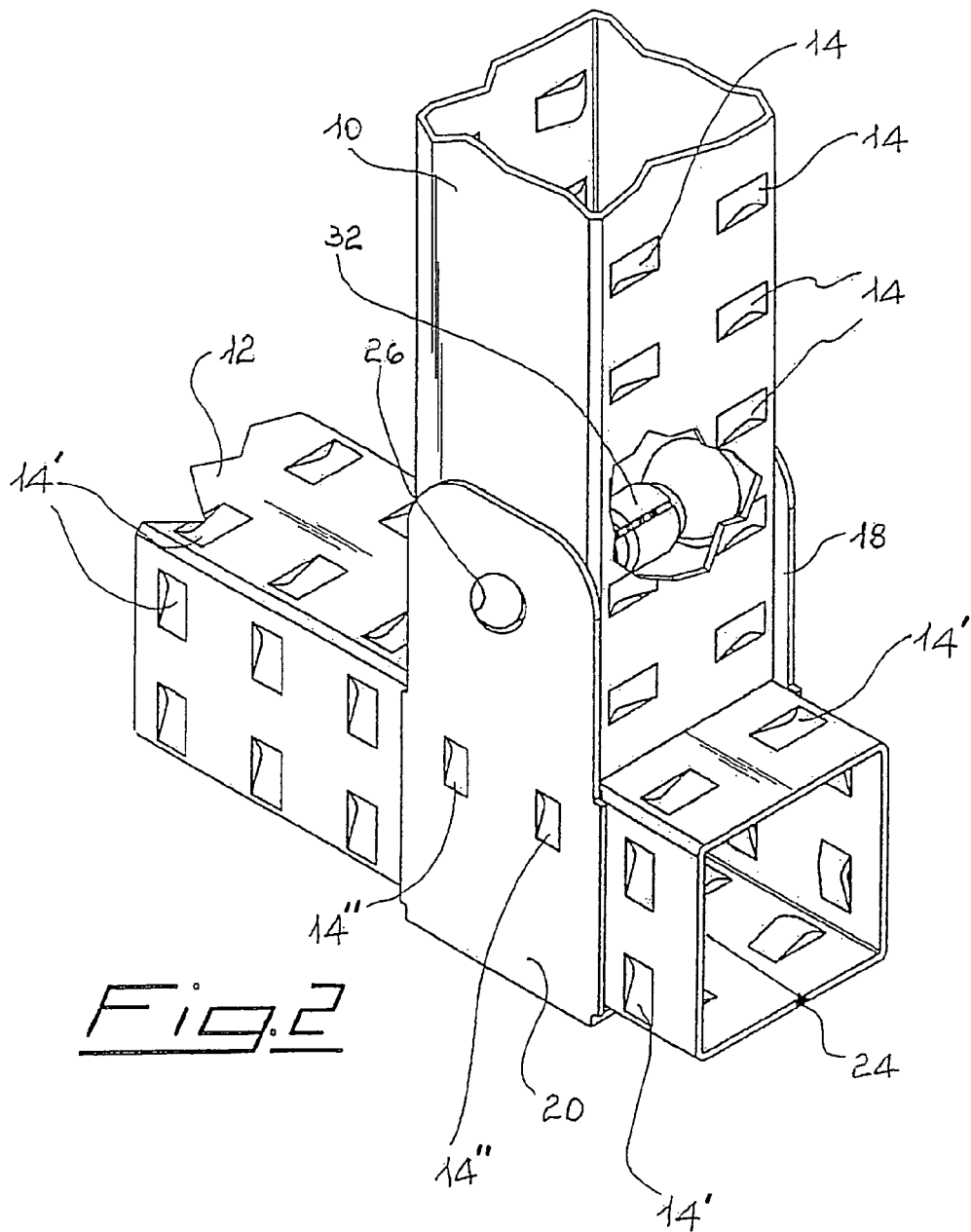
FIG. 2 shows a schematic perspective view from the opposite front, of the same segments of tubular bodies constrained with the forced locking device of the present invention.
Figure 3:
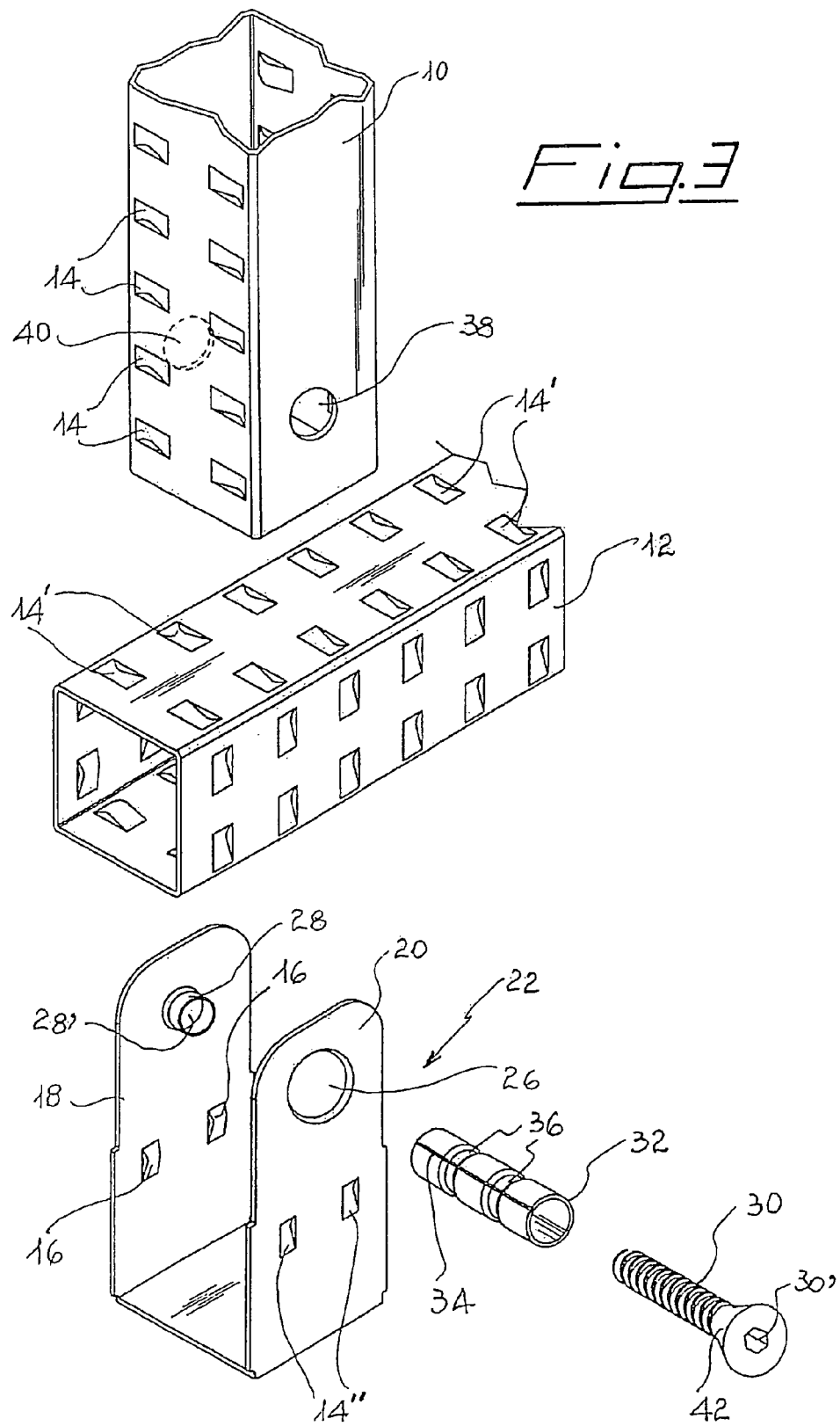
FIG. 3 shows a schematic exploded view of the segments of tubular bodies and relevant locking device according to FIG. 1.
Figure 4:
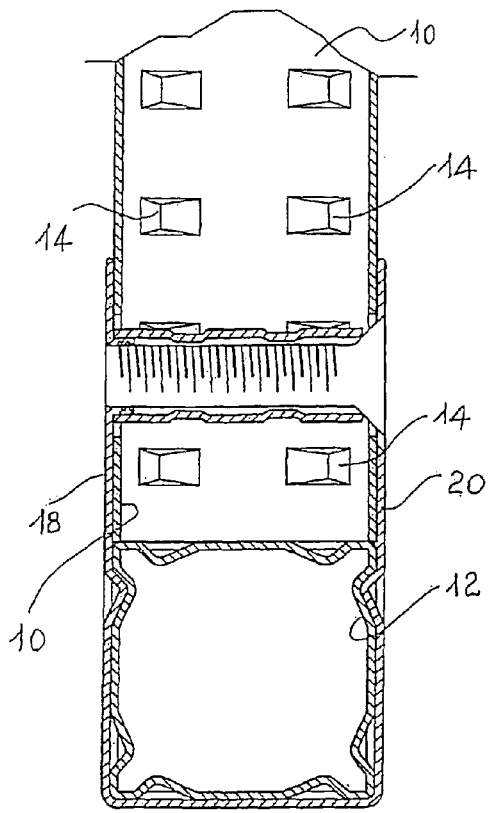
FIG. 4 shows a schematic front view of said segments constrained to one another by the forced locking device of the present invention.
Figure 5:
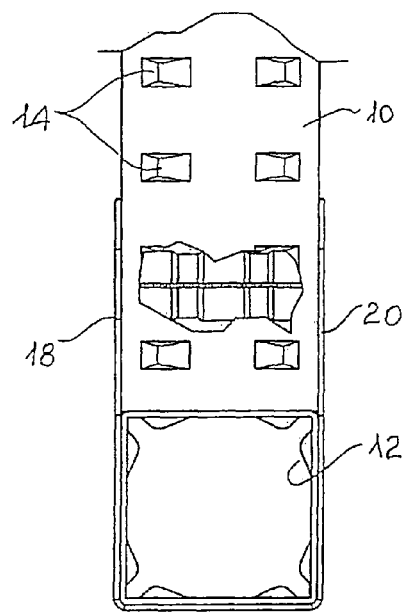
FIG. 5 shows a schematic front view of the same segments from the opposite side relative to FIG. 4.
Figure 6:
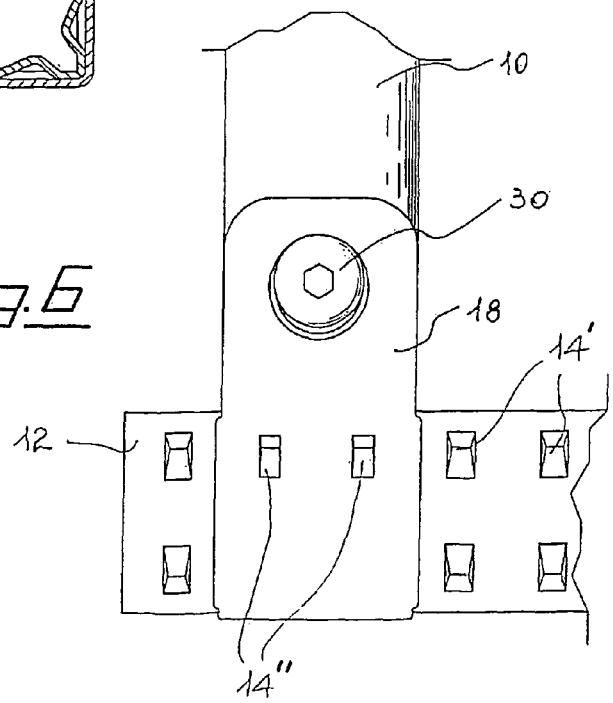
FIG. 6 shows a schematic front view of a detail of the segments of tubular bodies constrained to one another according to FIG. 1.

Said tubular elements, respectively indicated with reference numerals 10 and 12, exhibit a quadrangular section and are in fact provided, along the faces that constitute the side surface thereof, with a plurality of shaped recesses 14 and 14', respectively, wherein complementary projections 16 engage, which develop along the inner faces of the opposite and parallel branches 18, 20 of each "U" shaped band, globally schematised with reference numeral 22 in FIG. 3. The shaped recesses 14, 14' and projections 16 are obtained by moulding the sheet, prior to the bending thereof, which gives rise to the quadrangular section, and prior to the longitudinal welding of the section bar, schematised with reference numeral 24 in FIG. 2. Substantially, recesses 14, 14' made on the outer faces of the tubular elements 10, 12 give rise, on the opposite inner faces, to projections 16; as regards bands 22, advantageously made of steel, the recesses formed on the outer faces of branches 18 and 20 are indicated with reference numeral 14" and internally form said projections 16.

According to the invention, each band 22 is provided, in the top portion close to the free end of branches 18 and 20 thereof, respectively with a through opening 26 and with a collar 28 developed inwards of the bands themselves. In the exemplary embodiment of FIG. 3, the through opening 26 is made on branch 20 of band 22, whereas collar 28 protrudes from the inner front of branch 18 of the band itself and surrounds a circular threaded hole 28'.

The through opening 26 has a substantially circular shape, with a slight ovalisation along the vertical axis; collar 28, which develops within branch 18 of band 22, exhibits an extension which, by way of an example, is comprised between 1.5 and 3.5 mm and, as stated above, it surrounds a hole 28' which is provided with a threading for engaging a screw 30 suitable for connecting, by the same band, the tubular elements 10 and 12 oriented orthogonally to one another.

The forced locking device of the present invention further comprises a shaped metal bush 32 which, starting from one end, seats the threaded stem of screw 30; the opposite end of bush 32 is intended for fitting on collar 28. The same bush 32, moreover, is provided with a longitudinally extended slit 34, as well as two spaced out annular lowerings 36. Slit 34 allows bush 32 to slightly open during the forced locking of the tubular elements 10 and 12, and when it is led to precisely fit on collar 28; the annular lowerings 36, on the other hand, constitute as many centring points for the stem of screw 30 relative to the hole defined by bush 32. Advantageously, said collar 28 externally exhibits, along the zone that develops from the inner wall of branch 18 of band 22, a zone with marked edge and an opposite zone, facing the tubular element 12, with rounded edge. This allows bush 32, fitted on collar 28, to be tightened by screw 30 with movement in the direction of the tubular element 12.

According to a further feature of the invention, one of the two tubular elements to be connected to one another, for example element 10 is provided on two opposite faces of as many holes 38, 40, illustrated in FIG. 3 and arranged in the proximity of the bottom end or base of the same element 10. At least in the zones adjacent to holes 38 and 40, above and below them, the respective faces of the tubular element 10 are free from shaped recesses 14. Said holes 38 and 40 are crossed by screw 30 and, as regards hole 40, also by bush 32 which seats the stem of the screw itself. Holes 38 and 40 are slightly ovalised along the vertical axis, similar to hole 26 of band 22; relative to said hole 26 and to hole 28' of collar 28, the same holes 38 and 40 are located along an axis placed at the top. In the practice, when element 10 rests vertically on element 12, prior to the reciprocal locking thereof, the axis of holes 38, 40 as well as the axis of hole 26 and of hole 28' of collar 28 are not aligned; that of holes 38, 40 is located at a slightly higher level, which by way of an example may be quantified in a range comprised between 0.5 and 0.8 mm. Screw 30, having a suitable diameter, advantageously exhibits a flat head provided with a hexagonal seat 30' for a maneuvering wrench and, immediately close to the above head, it defines a conical portion 42; the same screw is sized by length so as to not protrude from hole 28' of collar 28, as it does not protrude on the opposite front since the flat head thereof aligns to band 22.

Based on the features indicated above, the device for the forced locking of two elements oriented orthogonally to one another operates as follows.

Figure 1:
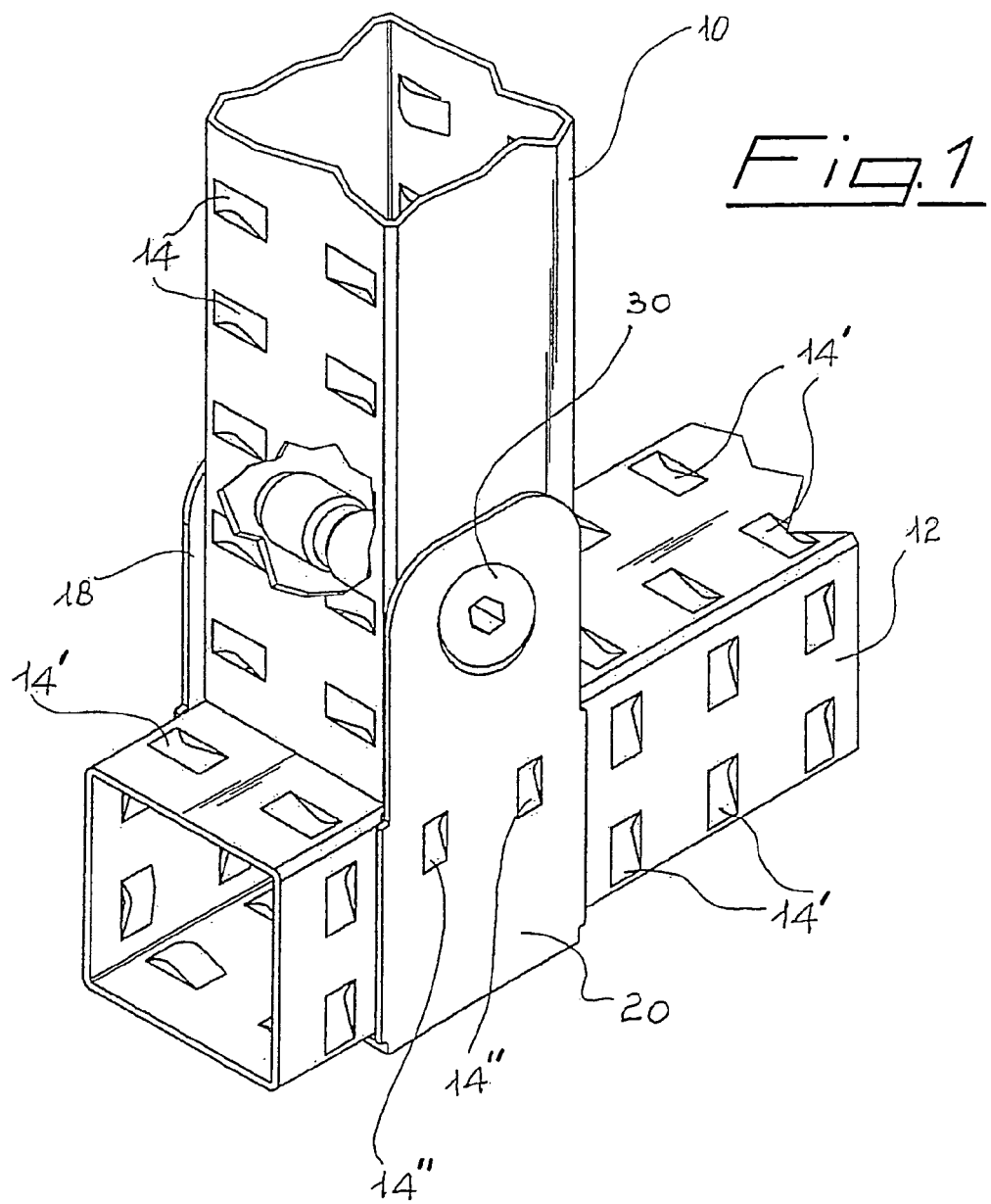
FIG. 1 shows a schematic perspective view from one front, of two segments of tubular bodies oriented orthogonally to one another and constrained through the forced locking device of the present invention.

The two tubular elements 10 and 12 are first positioned as required, which are arranged orthogonally relative to one another, for example as shown in FIGS. 1 and 2, wherein the first one is arranged vertically and the second one is arranged horizontally. By means of a band 22, said elements are partly delimited and projections 16 that develop from the inner front of branches 18, 20 of the same band insert into complementary shaped recesses 14" of the tubular element 12. At this point, holes 38 and 40 made in the proximity of the base of the tubular element 10 are only basically aligned to hole 26 and to the threaded hole 28' of collar 28 of band 22, provided that they are developed according to a top axis relative thereto. Screw 30 is inserted into bush 32; the set thus obtained is fit into hole 26 of band 22 and also crosses hole 38 of the tubular element 10. The front end of the threaded stem of screw 30 is led to screw into the threaded collar 28 and at the same time, the end of bush 32 wherefrom said threaded stem protrudes progressively fits on the same collar. Tightening screw 30, the conical portion 42 thereof close to the head is made to abut on the lower half-portion of the ovalised hole 38 of the tubular element 10, which is made to push according to a vertical direction on the tubular element 12. The same downward thrust takes place at the opposite hole 40 by the effect of the screwing of the stem end of screw 30 into hole 28' of the threaded collar 28 and by the concurrent fitting of an end of bush 32 onto the same collar. Said latter, the length whereof is suitably predetermined, also constitutes a spacer that determines the extent of screwing of screw 30. Once the tightening has been made, both the front portion where hole 38 is made, and the opposite back portion where hole 40 of the tubular element 10 is made, have received an even downward thrust, that is, in the direction of the tubular element 12 whereto they adhere perfectly. In these conditions, the axis of holes 38, 40 and the axis of hole 26 and of hole 28' delimited by collar 28 are coincident.

As can be noticed from the above, the advantages achieved by the invention are clear.

The device for the forced locking of two elements oriented orthogonally to one another determines a very effective and even constraint as regards the distribution of forces, by said elements allowing the make of bearing structures of various kind that ensure absolute stability. The locking device of the present invention is easy and inexpensive to make and moreover, it does not require elements or parts protruding from the various connecting bands.

While the invention has been described hereinbefore with particular reference to an embodiment thereof made by way of a non-limiting example, several changes and versions will appear clearly to a man skilled in the art in the light of the above description. The present invention is therefore intended to include any changes and versions thereof falling within the spirit and the scope of protection of the following claims.

The invention claimed is:

1. A structure comprising two tubular elements orthogonally oriented to one another, wherein each of said two tubular elements (10, 12) has a quadrangular section with a plurality of pairs of shaped recesses (14, 14') formed on at least one face of each tubular element and one of said tubular elements is provided with aligned holes (38, 40) arranged on two opposing faces of said one tubular element, and a connection device for the stable connecting and constraining of said two tubular elements, wherein said connection device comprises:

a) a U-shaped band (22) adapted to partly delimit said orthogonally oriented tubular elements, said U-shaped band having opposing vertical and parallel branches (18, 20) with pairs of projections (16) complementary to the plurality of pairs of shaped recesses (14, 14') formed on the tubular elements (10, 12), said projections (16) project from an inner face of the opposing branches (18, 20) of said U-shaped band;

b) a bush (32) adapted to extend between a hole (26) formed in one of said branches (18, 20) of said U-shaped band and a collar (28) projecting inwardly from the other of said branches, said bush being adapted to extend transversely between the aligned holes (38, 40) of the one of said tubular elements when said connection device connects said two tubular elements, said bush having an internal bore with a first diameter and having at least one annular lowering (36) with a second diameter being less than said first diameter and including a longitudinally extending slit (34); and c) a screw (30) adapted to be received in the bore of said bush (32) at an end opposing said collar (28), said collar (28) being internally threaded (28') to receive the threads of said screw whereby the screw crosses the aligned holes (38, 40) of said one tubular element when said connection device connects said two tubular elements, said at least one annular lowering (36) of said bush being adapted to center said screw in the bore of said bush and said slit (34) of said bush being adapted to open slightly with engagement of said screw with the threads (28') of said collar (28) so as to allow said bush to precisely fit on said collar and delimit the extent of threaded engagement of said screw with the threads (28') of said collar.

2. The structure according to claim 1, wherein said screw (30) exhibits a planar development head with a recess (30') for a maneuvering wrench formed on said head which exhibits a conical portion (42) adapted to cooperate with the holes (38, 40) arranged on the two opposite faces of said one tubular element (10, 12).

3. The structure according to claim 1, wherein said holes (38, 40) of said one tubular element (10, 12) and the hole (26) and the threaded hole (28') formed in the opposing branches (18, 20) of the U-shaped band (22) are misaligned relative to each other before tightening said screw (30).

4. The structure according to claim 3, wherein said hole (26) formed in said U-shaped band (22) and said holes (38, 40) of one of said tubular elements (10, 12) define an ovalization along a vertical axis.

5. The structure according to claim 1, wherein said collar (28) externally includes, along a zone developing from an inside wall of the vertical branch (18) of the U-shaped band (22), opposite zones respectively having a marked edge and a rounded edge.

* * * * *